United States Patent
Cochran

(10) Patent No.: US 7,867,462 B2
(45) Date of Patent: *Jan. 11, 2011

(54) COAL COMBUSTION SYSTEMS WITH EMISSIONS CONTROL AND FLY ASH BENEFICIATION AND METHODS THEREOF

(75) Inventor: Joseph W. Cochran, Palm Harbor, FL (US)

(73) Assignee: PMI Ash Technologies, LLC, Cary, NC (US)

( * ) Notice: Subject to any disclaimer, the term of this patent is extended or adjusted under 35 U.S.C. 154(b) by 390 days.

This patent is subject to a terminal disclaimer.

(21) Appl. No.: 11/526,426

(22) Filed: Sep. 25, 2006

(65) Prior Publication Data

US 2008/0075647 A1    Mar. 27, 2008

(51) Int. Cl.
*B01D 53/60* (2006.01)
*B01D 53/50* (2006.01)
*B01D 53/56* (2006.01)

(52) U.S. Cl. .................. 423/243.06; 423/210; 423/235; 423/237; 423/238

(58) Field of Classification Search .................. 423/210, 423/235, 237–238, 243.06

See application file for complete search history.

(56) References Cited

U.S. PATENT DOCUMENTS

| | | |
|---|---|---|
| 2,546,570 A | 3/1951 | Vance |
| 2,576,565 A | 11/1951 | Brown |
| 3,328,180 A | 6/1967 | Ban |
| 3,799,474 A | 3/1974 | Scharzler |
| 3,825,501 A | 7/1974 | Muenger |
| 3,979,168 A | 9/1976 | Chauvin |
| 4,003,986 A | 1/1977 | Lewis, Jr. |
| 4,034,063 A | 7/1977 | Rosar et al. |
| 4,043,831 A | 8/1977 | Friedman |

(Continued)

FOREIGN PATENT DOCUMENTS

DE    26 11 213 A    3/1976

(Continued)

OTHER PUBLICATIONS

Vincent M. Giampa, Ammonia Removal from Fly Ash by Carbon Burn-Out, 2000 Conference on Unburned Carbon on Utility Fly Ash, National Energy—Technology Laboratory, Department of Energy, St. Petersburg, FL, Dec. 2000.

(Continued)

*Primary Examiner*—Scott Kastler
*Assistant Examiner*—Brian Walck
(74) *Attorney, Agent, or Firm*—Nixon Peabody LLP

(57) ABSTRACT

A method and system for controlling emissions with ammonia recovery and fly ash beneficiation in accordance with the present invention includes introducing ammonia to react with at least a portion of sulfur trioxides in an exhaust emission and result in at least one or more ammoniated compounds. At a least a portion of fly ash particles and the ammoniated compounds in the exhaust emission are precipitated and at least the precipitated fly ash particles are beneficiated. At least a portion of the beneficiated fly ash particles which are heated are mixed with the precipitated ammoniated compounds to recover at least a portion of the ammonia. The recovered ammonia is reused in introducing ammonia to react with at least a portion of sulfur trioxides.

8 Claims, 2 Drawing Sheets

U.S. PATENT DOCUMENTS

| | | | |
|---|---|---|---|
| 4,064,219 A | | 12/1977 | Yamashita et al. |
| 4,121,945 A | | 10/1978 | Hurst et al. |
| 4,304,659 A | | 12/1981 | Pratt et al. |
| 4,325,833 A | | 4/1982 | Scott |
| 4,341,623 A | | 7/1982 | Bertolacini et al. |
| 4,705,409 A | | 11/1987 | Trerice |
| 4,911,900 A | * | 3/1990 | Horch et al. .............. 423/235 |
| 4,959,334 A | | 9/1990 | Mauleon et al. |
| 5,024,171 A | * | 6/1991 | Krigmont et al. .......... 110/345 |
| 5,051,245 A | | 9/1991 | Wilson et al. |
| 5,066,627 A | | 11/1991 | Owen et al. |
| 5,069,720 A | | 12/1991 | Epperly et al. |
| 5,160,539 A | | 11/1992 | Cochran |
| 5,273,727 A | | 12/1993 | Johnson |
| 5,276,727 A | | 12/1993 | Johnson |
| 5,399,194 A | | 3/1995 | Cochran et al. |
| 5,525,317 A | * | 6/1996 | Bhat et al. .................. 423/235 |
| 6,077,494 A | | 6/2000 | Gasiorowski et al. |
| 6,290,066 B1 | | 9/2001 | Hwang |
| 6,422,392 B1 | | 7/2002 | Levy |
| 6,605,263 B2 | | 8/2003 | Alix et al. |
| 6,746,654 B2 | * | 6/2004 | Mehta et al. ............... 423/237 |
| 6,755,901 B1 | | 6/2004 | Ramme et al. |
| 6,783,585 B2 | | 8/2004 | Zacarias et al. |
| 6,790,264 B2 | | 9/2004 | Minkara |
| 6,863,875 B1 | | 3/2005 | Kotake et al. |
| 7,223,375 B1 | * | 5/2007 | Cochran .................... 423/210 |
| 7,462,235 B2 | * | 12/2008 | Giampa et al. ............. 106/705 |
| 2002/0189497 A1 | | 12/2002 | Tranquilla |
| 2003/0202927 A1 | | 10/2003 | Minkara et al. |
| 2004/0033184 A1 | | 2/2004 | Greer |
| 2004/0069186 A1 | | 4/2004 | Zacarias et al. |
| 2007/0193476 A1 | | 8/2007 | Cochran et al. |

FOREIGN PATENT DOCUMENTS

| | | |
|---|---|---|
| DE | 35 26 756 A1 | 7/1985 |
| DE | 3526756 A1 | 1/1987 |
| DE | 38 02 844 A1 | 11/1987 |
| DE | 3802884 A1 | 8/1989 |
| EP | 0 227 196 B1 | 1/1987 |
| JP | 57053224 A | 3/1982 |
| JP | 59059237 A | 4/1984 |
| SU | 734162 | 5/1978 |

OTHER PUBLICATIONS

Vincent M. Giampa, Ammonia Removal from Coal Fly Ash by Carbon Burn-Out, 2001 Conference on Selective Catalytic Reduction (SCR) and Selective Non-Catalytic Reduction (SNCR) for NOx Control, National Energy Technology Laboratory, Department of Energy, St. Petersburg, FL, Dec. 2001.

Cheminfo: Ammonia Gas, Chemical Profiles Created by CCOHS, Canadian Centre for Occupational Health and Safety, www.worksafesask.ca/files/ccohs/cheminfo/cie48.html, printed Mar. 10, 2006.

Vincent M. Giampa, Ammonia Removal from Coal Fly Ash by Carbon Burn-Out, NETL Conference Proceedings, 2001, Pittsburg, PA, www.progressfuels.com/cbo/AmmoniaRemoval.html, printed Jun. 2, 2005.

W. Braker et al., Matheson Gas Products, Matheson Gas Data Book 6th Edition, 1980, pp. 23-29, Dec. 1980.

Compressed Gas Association, Handbook of Compressed Gases 3Rd Edition, 1990, pp. 231-252, Van Nostrand Reinhold Co., Dec. 1990.

T.A. Czuppon et al., Ammonia, Kirk-Othmer Encyclopedia of Chemical Technology 4th Edition, 1992, pp. 678-710, vol. 2, John Wiley & Sons, Dec. 1992.

Kevin P. Resnik et al., Aqua Ammonia for Simultaneous Removal of CO2, SO2, and NO., Department of Energy, National Energy Technology Laboratory, Published: International Journal of Environmental Technology and Management, 2004, vol. 4 Nos. 1/2, Dec. 2004.

Frequently Asked Questions: American Coal Ash Association, website: www.acaa-usa.org/FAQ.htm, printed Jun. 1, 2005.

Ammonia, Environmental and Technical Information for Problem Spills, Jul. 1984, pp. 1-14, Technical Services Branch, Environmental Protection Service, Ottawa, ON, Canada.

"Combustion: Fossil Power Systems," published by Combustion Engineering, Inc., 3rd Edition, 1981, p. 24-22, 24-23, Dec. 1981.

ASTM C618-05 "Standard Specification for Coal Fly Ash and Raw of Calcined Natural Pozzolan for Use in Concrete", Revised Jul. 1, 2005.

"Treatment of Mercury in Fly Ash by the CBO Process," by Joe Cochran and Vincent Giampa, Research Disclosure Journal, Jun. 2003.

* cited by examiner

COAL COMBUSTION SYSTEMS WITH EMISSIONS CONTROL AND FLY ASH BENEFICIATION AND METHODS THEREOF

FIELD OF THE INVENTION

This invention generally relates to coal combustion systems and methods and, more particularly, to coal combustion systems with emissions control and fly ash beneficiation and methods thereof.

BACKGROUND

Exhaust emission from coal fired furnaces or boilers such as those used in power plants, may contain a variety of different gases depending on the type of coal being burned. The amounts at which some of these gases could be emitted into the environment are regulated. For example, there are restrictions on the amount of nitrogen oxides which could be emitted into the atmosphere.

To reduce the amount of nitrogen oxides emitted into the environment, selective catalytic reactors have been added into the exhaust systems of coal fired furnaces and boilers such as at power plants. Ammonia is injected into a selective catalytic reactor (SCR) and mixes with the nitrogen oxides in the exhaust emission to produce nitrogen and water, thus reducing the amount of emitted nitrogen oxides.

Unfortunately, this retrofit of selective catalytic reactors to coal fired furnaces and boilers such as in power plants to reduce nitrogen oxides can also result in visible emissions known as "blue plume." This begins with the oxidation of a relatively small portion of the sulfur dioxides in the exhaust emissions to sulfur trioxide. Sulfur trioxide and water vapor readily combine to form an acid mist. Small amounts of water vapor, which may or may not be sufficient to convert enough sulfur trioxide to acid mist to become visible, are available in the exhaust gases both from humidity in the combustion air and products of combustion of the small amount of hydrogen in the coal. If there is insufficient water in the exhaust gases, blue plume may form downstream of the plant stack after the sulfur trioxide combine with atmospheric moisture. Finally, if the plant has a wet SO2 scrubber, there is abundant moisture present to convert a high fraction of the sulfur trioxide to acid mist and a substantial portion of this mist escapes the scrubber. The source of moisture merely controls where the acid mist is formed and, thereby, how visible it will be.

In any case, sulfuric acid mist is formed which can come down to the surface of the earth as acid rain. The long term health effects of sulfur trioxide or blue plume are not well known. The amount of sulfur dioxide catalyzed to sulfur trioxide and thence to acid mist is a relatively small fraction of the total sulfur from the coal burned. Nevertheless, the problem of blue plume is of great concern as evidenced by the purchase of most of the town of Chesire, Ohio by American Electric Power Co. (AEP) because of blue plume emitted from AEP's power plant which was upwind of the town of Chesire.

Several methods for essentially eliminating the acid mist and associated blue plume resulting from sulfur trioxide have been proposed. At least one has been reported successful, at least at pilot scale. This method involves injecting ammonia (at much higher dosages than are used in the SCR) to the exhaust gas at a point where its temperature has been reduced to the range of about 250-300° F. At this temperature, the ammonia reacts readily with the sulfur trioxide to form a number of possible compounds, the most notable of which are ammonium sulfate and ammonium bisulfate. The formation of these compounds by this reaction can capture a very high fraction of the sulfur trioxide thereby eliminating the conversion to acid mist and formation of blue plume.

This method of controlling blue plume, while highly effective, has several disadvantages. First, the large usage of ammonia constitutes a substantial expense. Second, if insufficient ammonia is injected, the reaction produces mostly ammonium bisulfate which is a very sticky, somewhat liquid substance at these temperatures. Ammonium bisulfate can quickly build up on downstream equipment and cause operational problems. Finally, even when sufficient ammonia is used to assure predominately ammonium sulfate (a dry powder) is formed, the ammoniated compounds are collected with and detrimental to the quality of the fly ash.

The most advantageous use for fly ash (highest value and largest quantity) is in concrete as a partial replacement for Portland cement. Even the smaller quantities of ammoniated compounds that sometimes results from SCR use are problematic for this use of fly ash. The much larger amounts of these compounds from blue plume control by ammonia injection make the ash completely unusable. Unusable ash is typically disposed of in landfills. However, since many of the ammoniated compounds (such as ammonium sulfate) are water soluble, it is not clear that landfill disposal will be acceptable for ash containing large quantities of these compounds.

Although the most advantageous use for fly ash is in concrete as a partial replacement for Portland cement, the fly ash often has a carbon content which makes it unsuitable for such use. As a result, the fly ash can not be used in this manner and must be disposed of in landfills.

SUMMARY

A method for controlling emissions with ammonia recovery and fly ash beneficiation in accordance with the present invention includes introducing ammonia to react with at least a portion of sulfur trioxides in an exhaust emission and result in at least one or more ammoniated compounds. At a least a portion of fly ash particles and the ammoniated compounds in the exhaust emission are precipitated and the precipitated fly ash particles are beneficiated. At least a portion of the beneficiated fly ash particles which are heated are mixed with the precipitated ammoniated compounds to recover at least a portion of the ammonia. The recovered ammonia is reused in introducing ammonia to react with at least a portion of sulfur trioxides.

A system for controlling emissions with ammonia recovery and fly ash beneficiation in accordance with other embodiments of the present invention includes a first ammonia delivery system, a precipitator system, beneficiation system, a recovery system, and a resupply system. The first ammonia delivery system is connected to an exhaust system to introduce ammonia that reacts with at least a portion of sulfur trioxides in an exhaust emission and results in at least one or more ammoniated compounds. The precipitator system precipitates at a least a portion of fly ash particles and the ammoniated compounds in the exhaust emission. The beneficiation system beneficiates the precipitated fly ash particles. The recovery system mixes at least a portion of the beneficiated fly ash particles which are heated with the precipitated ammoniated compounds to recover at least a portion of the ammonia. The resupply system supplies the recovered ammonia to the first ammonia delivery system.

A method for making a system for controlling emissions with ammonia recovery and fly ash beneficiation in accordance with other embodiments of the present invention includes connecting a first ammonia delivery system to an exhaust system. The first ammonia delivery system introduces ammonia that reacts with at least a portion of sulfur trioxides in an exhaust emission and results in at least one or more ammoniated compounds. A precipitator system is connected to the exhaust system and precipitates at a least a portion of fly ash particles and the ammoniated compounds in the exhaust emission. A recovery system is connected to the precipitator system to receive the precipitated fly ash particles. A beneficiation system is connected to the recovery system and beneficiates the precipitated fly ash particles. At least a portion of the beneficiated fly ash particles which are heated are provided to and mixed with the precipitated ammoniated compounds in the recovery system to recover at least a portion of the ammonia. A resupply system is connected to the recovery system and supplies the recovered ammonia to at least the first ammonia delivery system.

The present invention provides a number of advantages including providing an effective system and method for controlling and reducing nitrogen oxides and sulfur trioxides in exhaust emission while recovering ammonia. Additionally, the fly ash particles, from which the ammonia is recovered, could be used for other applications, such as a substitute for a portion of the cement in concrete.

The present invention provides a system in which NH3 injection could be used for its very effective control of nitrogen oxides and also control of blue plume (along with partial capture of sulfur compounds from the exhaust gases). The present invention is able to achieve this control by utilizing the high concentrations of ammonia necessary to avoid creating problems in downstream power plant equipment, but without the large increase in ammonia cost and without contaminating the resulting fly ash, such that is cannot be beneficially used. In particular, the present invention precipitates the ammoniated compounds from the exhaust emissions and recaptures the ammonia gas for reuse which provides the cost savings and removes the ammonia contamination from the resulting fly ash particles. Further, the present invention is able to recapture the ammonia in manner which does not require the introduction of additional heated gas enables the gaseous ammonia to be recaptured in higher concentrations providing further cost savings. Even further, the present invention accomplishes this recapture without creating substantial new emissions, such as the conversion of ammoniated compounds into oxides of nitrogen.

In addition to recapturing and reusing the ammonia, the present invention is also able to reduce the carbon content of the fly ash particles to a level where they are suitable for use as a partial replacement for Portland cement.

DETAILED DESCRIPTION

Figure 1A:
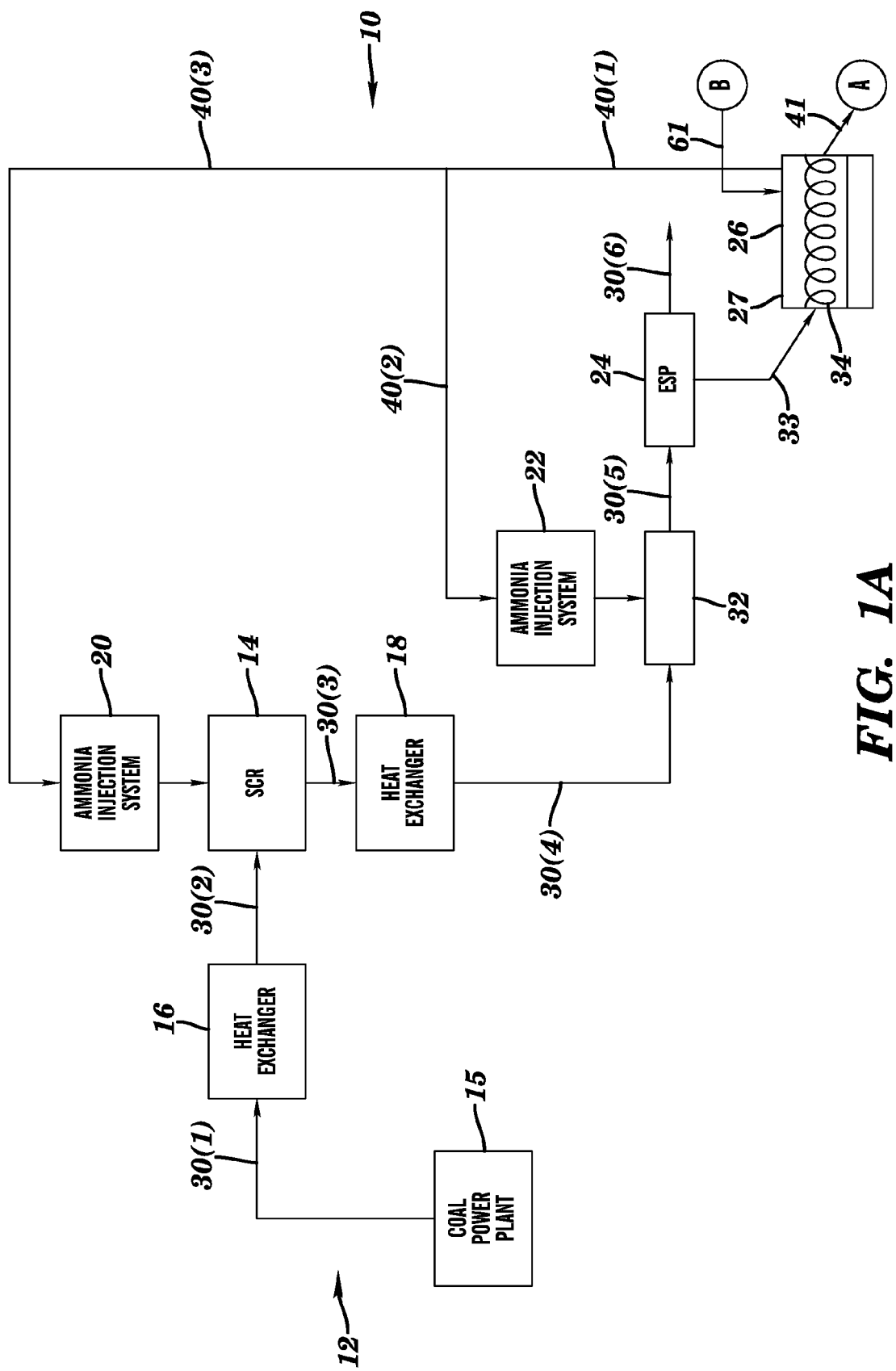
FIGS. 1A-1B are block diagrams of a coal combustion system with emissions control and fly ash beneficiation in accordance other embodiments of the present invention.
Figure 1B:
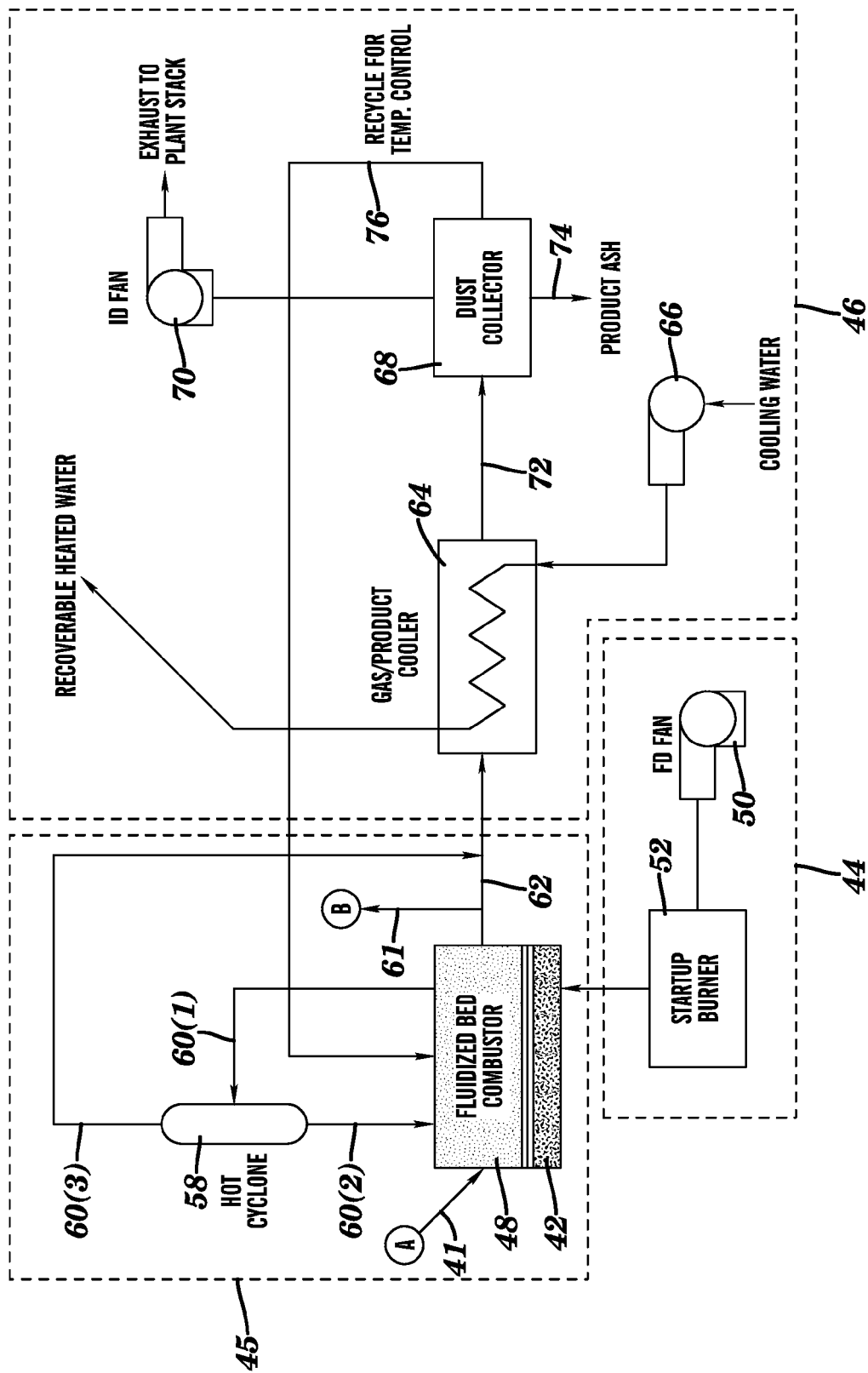

A coal combustion system 10 with emissions control and fly ash beneficiation in accordance with embodiments of the present invention are illustrated in FIGS. 1A-1B. The system 10 includes an exhaust system 12, a selective catalytic reactor 14 (SCR), heat exchangers 16 and 18, ammonia injection systems 20 and 22, an electrostatic precipitator 24 (ESP), an ammonia recovery system 26, a collection bin 28, a fluid bed reactor 42, a fluid supply system 44, a exhaust system 45, and an fly ash output processing system 46, although the system 10 can comprise other numbers and types of components in other configurations. The present invention provides an effective system and method for reducing nitrogen oxides and sulfur trioxides in the exhaust emission, for recapturing and reusing at least a portion of the injected ammonia used in reducing the nitrogen oxides and sulfur trioxide, and for reducing the carbon content of the fly ash particles to a level where they are suitable for use as a partial replacement for Portland cement.

Referring to FIG. 1A, the exhaust system 12 comprises a number of lines, ducts or pipes 30(1)-30(6) and a chamber 32 which are used to transport and process the exhaust emission, although the exhaust system 12 can comprise other types and numbers of components for carrying and processing the exhaust emissions in other configurations. The line 30(1) of the exhaust system 12 is connected to the exhaust emission outlet of a coal power plant furnace 15, although the exhaust system 12 could be connected to other sources of exhaust emission, such as to a coal fired industrial furnace. The exhaust emission from the coal power plant 15 or other exhaust emission source which is input to the line 30(1) of the exhaust system 12 includes fly ash particles and one or more other gases, such as sulfur dioxides and nitrogen oxides, although the exhaust emission could include other elements.

The heat exchanger 16 (called an economizer in a coal fired power plant or similar boiler) is connected between the line 30(1) from the coal power plant furnace 15 and the line 30(2) to the selective catalytic reactor 14, although the heat exchanger 16 could be connected to other components and in other configurations. The heat exchanger 16 reduces the temperature of the exhaust emission to between about 600 degrees to 750 degrees Fahrenheit which is a more optimal temperature for the removal of at least a portion of the nitrogen oxides in the selective catalytic reactor 14, although the temperature of the exhaust emission could be adjusted to other temperatures.

The selective catalytic reactor 14 is connected between the line 30(2) from the heat exchanger 16 and the line 30(3) to the heat exchanger 18 (called an air preheater in a coal fired power plant or similar boiler), although the selective catalytic reactor 14 could be connected to other components and in other configurations and other post combustion treatment systems could be used, such as a selective non-catalytic reactor. An ammonia injection system 20 is connected to and injects the ammonia ($NH_3$) into the selective catalytic reactor 14 which is used to react with and reduce the amount of nitrogen oxides in the exhaust emission, although other reagents could be used. By way of example only, if a selective non-catalytic reactor is used instead of the selective catalytic reactor 14, then reagents, such as ammonia ($NH_3$) or urea could be used. In this embodiment, the selective catalytic reactor 14 uses ammonia ($NH_3$) to reduce nitrogen oxides ($NO_X$) in the exhaust emission to nitrogen (N) and water ($H_2O$) in a chemical reduction. By way of example, this reaction can be illustrated by the following generalized formula:

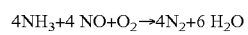
$$4NH_3 + 4NO + O_2 \rightarrow 4N_2 + 6H_2O$$

Alternatively, if a selective non-catalytic reactor is used instead of the selective catalytic reactor 14 and urea is used as the reagent, then the reaction would be:

$$2NO + CO(NH_2)_2 + \tfrac{1}{2}O_2 \rightarrow 2N_2 + CO_2 + 2H_2O$$

Referring back to the embodiment shown in FIGS. 1A-1B, the catalytic action of the selective catalytic reactor 14 also causes a portion of the sulfur dioxide ($SO_2$) in the exhaust emission to react with oxygen to generate sulfur trioxide ($SO_3$) as illustrated in the following generalized formula:

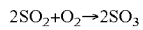

The sulfur trioxide in the exhaust emission further reacts with moisture either in the exhaust or after release to the atmosphere to form acid mist (primarily tiny $H_2SO_4$ droplets) by the following generalized formula:

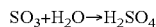

This acid mist results in blue plume when released into the environment.

Another heat exchanger 18, which is called an air preheater in a coal fired power plant or similar boiler, is connected in the exhaust system 12 between the line 30(3) from the selective catalytic reactor 14 and the line 30(4) in the chamber 32, although the heat exchanger 18 could be connected to other components and in other configurations. The heat exchanger 18 reduces the temperature of the exhaust emission to between about 275 degrees to 300 degrees Fahrenheit which is a more optimal temperature for the removal of at least a portion of the sulfur trioxides in the exhaust emission, although the temperature of the exhaust emission could be adjusted to other temperatures.

The chamber 32 is connected in the exhaust system 12 between the line 30(4) from the heat exchanger 18 and the line 30(5) to the electrostatic precipitator 24, although the chamber 32 could be connected to other components in other configurations. The ammonia injection system 22 is connected to and used to inject the ammonia into the chamber 32, although other manners for supplying ammonia could be used. At least a portion of the sulfur trioxides react with the ammonia in the chamber 32 to form primarily ammonium sulfate and ammonium bisulfate, although other ammoniated compounds may be formed in smaller quantities and the mixing and reacting can take place in other types of vessels and in other locations. Generally, ammonium bisulfate particles, which are sticky, adhere to the fly ash particles while ammonium sulfate particles, which are dry solids, and thus are separate from, but mixed with, the fly ash particles.

The electrostatic precipitator 24 is connected between the line 30(5) from the chamber 32 and the line 30(6) which outputs the exhaust emissions to the environment or other location such as the inlet of a wet scrubber for SO2 removal. The electrostatic precipitator 24 also is connected to supply precipitated fly ash particles (with the included ammoniated compounds) by a pipe 33 to the ammonia recovery system 26, although the electrostatic precipitator 24 could be connected to other components and in other configurations. The electrostatic precipitator 24 is used to precipitate at least a portion of the fly ash particles and the ammoniated compounds from the exhaust emission, although other manners for separating the fly ash particles from the exhaust emission, such as baghouses, cyclones and wet electrostatic precipitators could be used.

The ammonia recovery system 26 is used to recover at least a portion of the ammonia injected into the exhaust emission by the ammonia injection systems 20 and 22 during the reduction of nitrogen oxides and sulfur trioxides. The ammonia injection systems 20 and 22 provide for injection of recovered ammonia in a gaseous stream in addition to injection of liquid or vaporized fresh ammonia through typical SCR nozzles, although the ammonia injection systems 20 and 22 could introduce ammonia and/or other reagents in other manners.

The ammonia recovery system 26 includes a container 27 with a chamber and a mixing device 34 in the chamber, although the ammonia recovery system 26 can comprise other types and numbers of components. The container 27 is connected to receive the precipitated fly ash particles via the pipe 33 from the electrostatic precipitator 24 and also heated and beneficiated fly ash particles, although the ammonia recovery system 26 could be connected to other components and in other configurations including, for example, intermediate fly ash storage and transport systems. The mixing device 34 is used to mix the precipitated fly ash particles and the heated and beneficiated fly ash particles. The beneficiated fly ash particles are supplied to the container 27 from fluid bed reactor 42 in a quantity that results in a temperature for the mixture of fly ash particles which provides for the decomposition and recovery of at least a portion of the ammonia. In these particular embodiments, this temperature for the mixture of fly ash particles ranges between about 500° F. and 842° F. to provide for the decomposition of at least a portion of the ammonia, although the mixture can be heated to other temperatures.

The ammonia recovery system 26 also has an output connected to the fluid bed reactor 42 to supply the processed fly ash particles and another output connected to pipes 40(1)-40(3) to return the recovered ammonia along with the now cooler gas and smaller quantities of the fly ash back to the ammonia injection systems 20 and 22, although other numbers and types of outputs from the ammonia recovery system 26 could be used and the outputs can be connected to other components in other configurations. For example, the stream in pipes 40(1)-40(3) could be routed through a cyclone or similar dust collection system to return the small amounts of fly ash to the fluid bed reactor 42 and avoid recirculating it through the ammonia injection systems 20 and 22.

Referring to FIG. 1B, the fluid bed reactor 42 is a dry bubbling fluid bed which is used in the beneficiation of fly ash particles output from container 27 via an output line 41, although other types and numbers of well mixed reactors can be used and some or all of the fly ash particles can be supplied from other sources. The fluid bed reactor 42 includes a chamber 48, although the chamber 48 can have other numbers and types of inlets and outlets and also other numbers of internal compartments.

The fluid supply system 44 is connected to the fluid bed reactor 42 and provides air which may be heated during process startup or as otherwise needed to the chamber 48 of the reactor 42 to fluidize the fly ash particles in the chamber 48 and create a fluid bed, although the fluid supply system 44 can provide other types of fluids which may or may not be heated to the chamber 48. In these particular embodiments, the temperature of the fluid bed is controlled in one of several known manners to about 1375° F. or below, although the fluid bed can be operated at other temperatures, such as a fluid bed temperature of about 1550° F. or below. The fluid supply system 44 includes a forced draft fan 50 and an air pre-heater or start-up burner 52, although the fluid supply system 44 can comprise other numbers and types of components in other configurations and other types of fluid supply systems can be used. An outlet of the forced draft fan 50 is connected to an inlet of the air pre-heater 52 and an outlet of the air pre-heater 52 is connected to an inlet of the reactor 42, although other configurations can be used.

The exhaust system 45 receives one or more gases and fly ash particles from an outlet in the chamber 48 of fluid bed reactor 42, collects fly ash particles in the exhaust gas or gases in a cyclone 58, and gravity feeds the collected fly ash particles back to the chamber 48, although other configurations for the exhaust system 45 can be used. The exhaust system 45 includes the cyclone 58 and exhaust lines 60(1)-60(3), although the exhaust system 45 can comprise other numbers and types of components in other configurations, such as other types and numbers of dust collectors and exhaust lines in other configurations. The exhaust line 60(1) feeds a portion of the one or more gases and fly ash particles from the chamber 48 to the cyclone 58, the exhaust line 60(2) gravity feeds the collected fly ash particles back to the chamber 48, and the exhaust line 60(3) feeds the other portion of the one or more gases and fly ash particles from the chamber 48 to an output line 62 from the fluid bed reactor 42, although other numbers and types of exhaust components in other configurations could be used.

The fly ash output processing system 46 outputs the beneficiated fly ash particles which are now suitable for other applications, such as a replacement for a portion of the cement in concrete. The fly ash output processing system 46 includes the output line 62 from the fluid bed reactor 42, a gas/product cooler system 64, a cooling water supply system 66, a dust collector system 68, and an induced draft (ID) fan system 70, although fly ash output processing system 46 can comprise other numbers and types of components in other configurations. The beneficiated fly ash particles and gases are supplied by the output line 62 to the gas/product cooler system 64. The gas/product cooler system 64 receives a supply of cooling water from water supply system 66 which is used to cool the beneficiated fly ash particles and gases, although other fluids and/or cooling systems could be used. For example, the heat recovered in the gas/product cooler system 64 may be used to produce steam or heat air or other gases. The cooled beneficiated fly ash particles and gases are output from the gas/product cooler system 64 via an output line 72 to the dust collector system 68 which separates and outputs the beneficiated fly ash particles and exhausts the gases with the assistance of the ID fan system 70. A portion of the beneficiated fly ash particles are fed back to the chamber 48 via output line 76 to help control and regulate the temperature in the fluid bed. In these embodiments, the temperature in the fluid bed in the chamber is at or below about 1375° F., although the fluid bed in the chamber can be operated at other temperatures. Another portion of the beneficiated fly ash particles are fed back to the chamber in container 27 to mix with the fly ash particles from the electrostatic precipitator 24. These beneficiated fly ash particles are heated and are supplied in a quantity to raise the temperature of the mixture so that at least a portion of the ammonia can be decomposed and recovered from the fly ash particles from the electrostatic precipitator 24.

The operation of the coal combustion system 10 with emissions control and fly ash beneficiation 10 will now be described with reference to FIGS. 1A-1B. Pulverized coal particles are combusted in the coal fired furnace 15 and the exhaust emission from this combustion is output into the line 30(1) of the exhaust system 12, although the exhaust emission could be provided by other sources and could be output in other manners. The exhaust emission includes fly ash particles and one or more other gases, such as sulfur dioxides and nitrogen oxides, although the exhaust emission could include other elements.

Next, the exhaust emission, which is above about 750 degrees, is input to the heat exchanger 16 via line 30(1) where the temperature of the exhaust emission is reduced to between about 600 degrees to 750 degrees Fahrenheit to be at a more optimal temperature for the removal of at least a portion of the nitrogen oxides in the selective catalytic reactor 14, although the temperature of the exhaust emission could be reduced to other temperatures.

Once the temperature of the exhaust emission is reduced to between about 600 degrees to 750 degrees Fahrenheit, the exhaust emission is provided via line 30(2) to the selective catalytic reactor 14. Additionally, ammonia ($NH_3$) is supplied from the ammonia injection system 20 to the selective catalytic reactor 14, although other reagents and other manners for reducing the nitrogen oxides could be used. The ammonia ($NH_3$) in the selective catalytic reactor 14 converts the nitrogen oxides to nitrogen (N) and water ($H_2O$) in a chemical reduction in the selective catalytic converter 14. With the present invention, the ammonia can be introduced by the ammonia injection system 20 at a rate which substantially eliminates the nitrogen oxides. This is possible despite the additional cost of the ammonia because with the present invention at least a portion of the ammonia is recovered and reused.

During the reduction process described above, sulfur dioxide and oxygen, which are also present in the exhaust emission, react in the presence of the catalyst in the selective catalytic reactor 14 to generate sulfur trioxide ($SO_3$). The amount of sulfur dioxide in the exhaust emission depends on the amount of sulfur in the coal which was combusted and produced the exhaust emission.

Next, the temperature of the exhaust emission leaving the selective catalytic reactor 14 is further reduced to a temperature between about 275 degrees to 300 degrees Fahrenheit to be at a more optimal temperature for the removal of at least a portion of the sulfur trioxides in the exhaust emission, although the temperature of the exhaust emission could be reduced to other temperatures.

Once the temperature of the exhaust emission from the selective catalytic reactor 14 is reduced to a temperature between about 275 degrees to 300 degrees Fahrenheit, the exhaust emission is provided via line 30(4) to the chamber 32. Additionally, ammonia is provided to the chamber 32 from the ammonia injection system 22, although other manners and configurations could be used. The ammonia supplied by the ammonia injection system 22 reacts with at least a portion of the sulfur trioxides which causes the reacted sulfur trioxides to form ammoniated compounds that adhere and/or are mixed in with the fly ash particles. In these embodiments, the ammonia is introduced by the ammonia injection system 22 at a rate which results in a majority of the ammoniated compounds comprising ammonium sulfate particles, although the ammonia can be introduced at other rates with other types and amounts of resulting compounds. Additionally, the amount of ammonia supplied by the ammonia injection system 22 to the exhaust emission in the chamber 32 is greater than the amount of ammonia supplied by the ammonia injection system 20 to the exhaust emission in the selective catalytic reactor 14. This greater amount of ammonia is needed to obtain the desired conversion of the sulfur trioxides to dry, solid ammoniated compounds in the exhaust emission. In this particular embodiment, the amount of ammonia supplied by ammonia injection system 22 is about ten times the amount supplied by the ammonia injection system 20 to obtain the desired conversion of at least a portion of the sulfur trioxides, although other ratios of supplied ammonia by the respective ammonia injection systems 20 and 22 could be used.

Next, the fly ash particles with the included ammoniated compounds are supplied via line 30(5) to the electrostatic precipitator 24 where they are at least partially precipitated out of the exhaust emission, although other manners for separating the fly ash particles and ammoniated compounds from the exhaust emission could be used. The precipitated fly ash particles are supplied via a pipe 33 to a chamber in the container 27 of the ammonia recovery system 26, although the precipitated fly ash particles could be supplied to other locations and in other manners.

The mixing device 34 evenly distributes the fly ash particles from the electrostatic precipitator 24 in container 27 with the heated beneficiated fly ash particles from the dust collector system 68 via output line 74 thereby heating the mixture of fly ash particles to a selected temperature. In these particular embodiments, this temperature ranges between about 500° F. and 842° F., although the mixture of fly ash particles can be heated to other temperatures. After a selected residence time at this temperature, at least a portion of the ammoniated compounds decompose into ammonia and other gases such as $SO_2$. The recovered ammonia along with the now cooler exhaust gas and any other gaseous by-products are output to the pipe 40(1) which is connected to pipe 40(2) and to pipe 40(3), although the ammonia could be output in other manners and configurations, such as to a storage container. In this particular embodiment, the pipe 40(2) supplies a portion of the recovered ammonia stream to the ammonia injection system 22 and the pipe 40(3) supplies a portion of the recovered ammonia stream to the ammonia injection system 20.

Next, the mixed and heated fly ash particles are output from the container 27 via output line 41 to the chamber 48 in the fluid bed reactor 42, although the fly ash particles can be supplied to the fluid bed reactor 42 in other manners and other sources of fly ash particles can be used to supply the fluid bed reactor 42.

Meanwhile, air is drawn in by fan 50 and may be heated by pre-heater 52 to the desired temperatures for start-up or as otherwise desired, although pre-heating is not required during operation and other types of fluids and methods of fluidizing the bed could be used. The air is supplied to the chamber 48 and causes fluidization and mixing of the fly ash particles in the chamber 48. Fan 50 supplies the air into chamber 48 at a superficial velocity (the actual upward air velocity at the fluid bed operating temperature and pressure if no fly ash particles were present) of at least about 0.5 feet per second, but less than 3.0 feet per second.

As the fly ash particles travel in the fluid bed in chamber 48, they intimately mix with the air being forced up by fan 50. Oxygen within the air chemically reacts with the fly ash particles to oxidize a portion of the carbon therein and thereby reduce the carbon content of the fly ash particles. The chamber 48 is sized and the level of fluid bed in chamber 48 is controlled so that the fly ash particles have a residence time in the fluid bed of at least two minutes, although the residence can vary based on the particular application.

The hot gases and some of the fly ash particles rise within chamber 48 and circulate out through an outlet into exhaust line 60(1) and up to the cyclone 58. The cyclone 58 separates any fly ash particles, which are typically of a dust-like character, from the exhausted gas or gases. The fly ash particles collected in the cyclone 58 are gravity fed back to the chamber 48 via exhaust line 60(2) into the chamber 48. The rate at which the collected fly ash particles from dust collector 62 reenter chamber 48 can be metered. The exhaust gas or gases pass out of the cyclone 58 into another exhaust line 60(3) which is coupled to the output line 62 to mix with the beneficiated fly ash particles being expelled from the fluid bed reactor 42.

The beneficiated fly ash particles in the chamber 48 exit from the fluid bed reactor 42 via the output line 62 into the gas/product cooler system 64. The beneficiated fly ash particles and gases are cooled by the gas/product cooler system 64 which receives cooling water from cooling water system 66, although other types and numbers of fluids and/or cooling systems could be used. The cooled beneficiated fly ash particles and gases are output from the gas/product cooler system 64 via output line 72 to the dust collector system 68 which separates and outputs the beneficiated fly ash particles to output line 74 and exhausts the gases with the assistance of the ID fan system 70. A portion of the beneficiated fly ash particles are fed back via the output line 74 to the container 27 to help control and regulate the temperature of the mixture of fly ash particles to permit the decomposition of ammonia. In these particular embodiments, the temperature of the mixture of fly ash particles in the container 27 ranges between about 500° F. and 842° F. to provide for the decomposition of at least a portion of the ammonia, although the mixture can be heated to other temperatures.

The product fly ash beneficiated by the present invention has a sufficiently low ammonia and carbon content to permit it to be used, without further processing, as a replacement for a portion of the cement in concrete or for other applications, such as mineral filler or as an addition to concrete to give the concrete better properties. In these embodiments, the beneficiated product fly ash has a carbon content of less than approximately 6% and often less than 2%, although the percentage of carbon content in the beneficiated product fly ash can vary. Additionally, the ammonia used to address control of nitrogen oxides and sulfur trioxides in the exhaust emission, can be at least partially recovered to eliminate concerns about the amount of ammonia injected to control nitrogen oxides and sulfur trioxides and to make the emission control processes more economically feasible to operate.

Accordingly, the present invention provides an effective system and method for controlling and reducing nitrogen oxide and sulfur trioxide in the exhaust emission using ammonia at injection rates that prevent formation of undesirable sticky ammoniated compounds that could damage downstream equipment. Additionally, the present invention is able to recapture and reuse at least a portion of the injected ammonia used in reducing the nitrogen oxide and sulfur trioxide in exhaust emission. Further, the present invention is able to reduce the ammonia and carbon content of the fly ash particles so they are suitable condition for use in other applications, such as for use as a partial replacement for Portland cement.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling emissions of a coal-fired furnace with ammonia recovery and fly ash beneficiation, the method comprising:

introducing ammonia to react at a temperature of from about 600° F. to 750° F. with at least a portion of nitrogen oxides and sulfur oxides in the exhaust emission;

introducing ammonia to react at a temperature of from about 275° F. to 300° F. with at least a portion of sulfur trioxides in the exhaust emission and produce at least one or more ammoniated compounds;

precipitating at least a portion of fly ash particles and the ammoniated compounds in the exhaust emission;

beneficiating in a first vessel at least the precipitated fly ash particles by reducing carbon content of the precipitated fly ash particles to a level of less than about 6% carbon to produce hot beneficiated fly ash particles;

mixing in a second vessel at least a portion of the hot beneficiated fly ash particles with the precipitated ammoniated compounds such that the mixture is at a temperature of from about 500° F. to 842° F. to recover at least a portion of the ammonia; and reusing the recovered ammonia in the introducing ammonia steps to react with at least a portion of the nitrogen oxides and sulfur trioxides.

2. The method as set forth in claim 1 further comprising combusting coal which creates the exhaust emission.

3. The method as set forth in claim 1 wherein the introducing ammonia is at a rate wherein at least a majority of the resulting ammoniated compounds comprise ammonium sulfate.

4. The method as set forth in claim 1 further comprising introducing initial ammonia to react with at least a portion of nitrogen oxides and sulfur dioxides in the exhaust emission and result in at least sulfur trioxides before the introducing ammonia to react with at least the portion of sulfur trioxides;

wherein the recovering recovers at least a portion of the initial ammonia from the precipitated ammoniated compounds with heat from the exhaust emission of the beneficiation process; and wherein the reusing reuses the recovered ammonia and the recovered initial ammonia in at least one of the introducing the initial ammonia and the introducing the ammonia.

5. The method as set forth in claim 4 wherein at least one of the initial ammonia and the ammonia are introduced in a gaseous form and at least a partially liquid form.

6. The method as set forth in claim 1 wherein the beneficiating further comprises:

introducing the precipitated fly ash particles and at least one fluid to a fluid bed; and oxidizing at least a portion of the carbon in the precipitated fly ash particles by mixing the precipitated fly ash particles with air in the fluid bed.

7. The method as set forth in claim 6 further comprising heating the at least one fluid at least during a startup period.

8. The method as set forth in claim 1 further comprising collecting at least a portion of the fly ash particles after the beneficiating.

* * * * *